Figure 3:
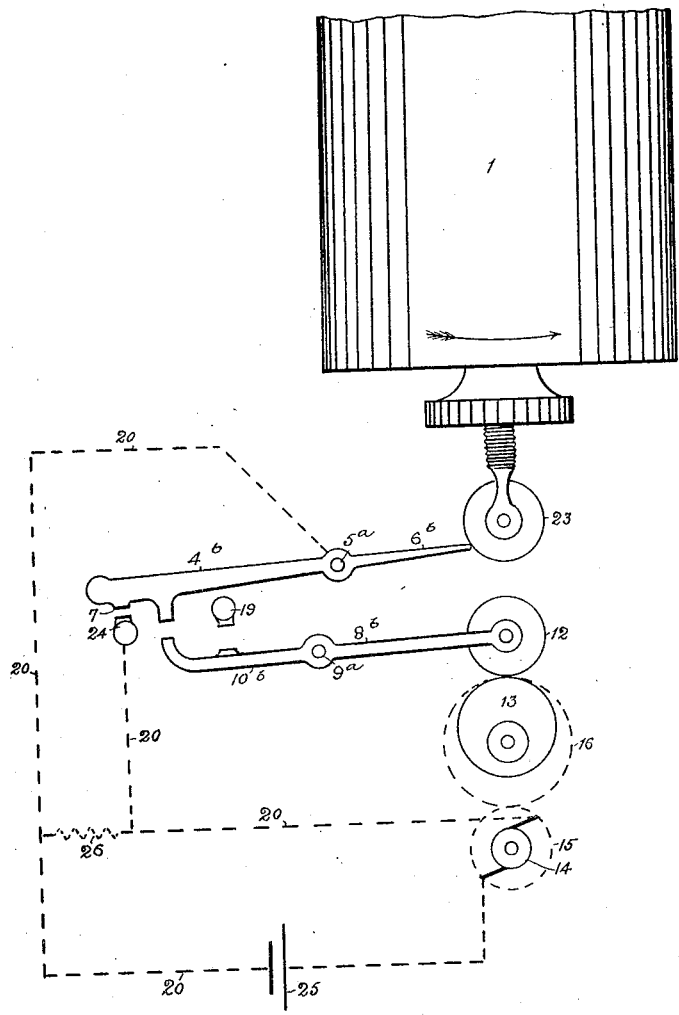

Aug. 19, 1924.
A. STEUART
1,505,610
CLOCK, CHRONOGRAPH, AND THE LIKE
Filed June 22, 1923     2 Sheets-Sheet 1
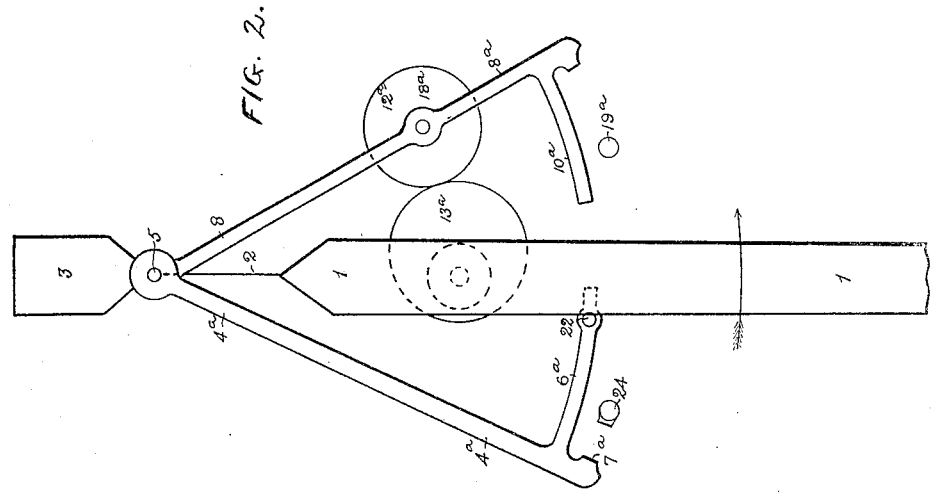
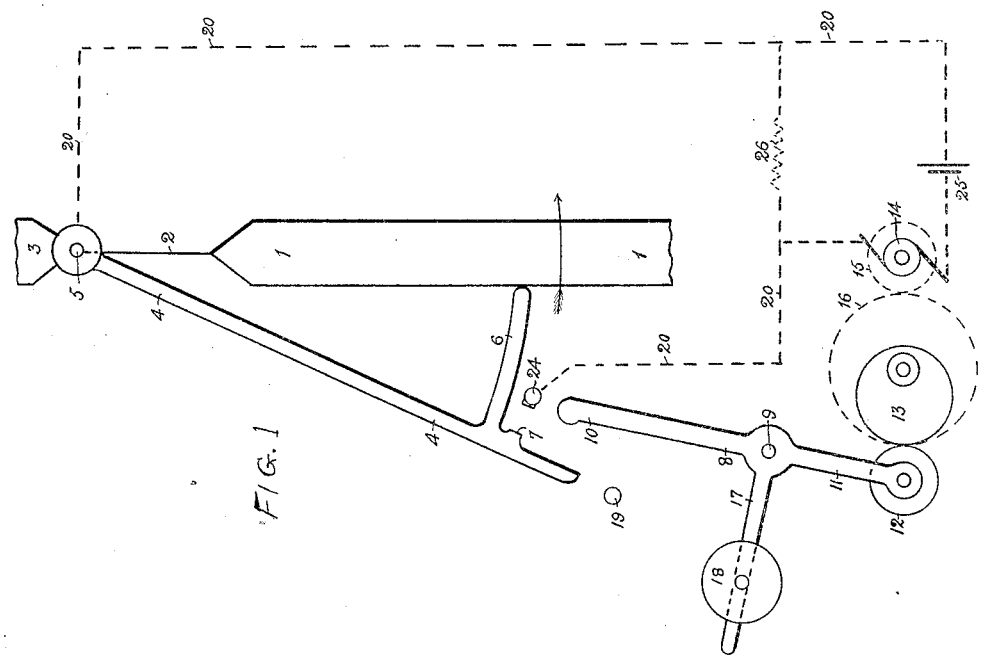
INVENTOR:
Alexander Steuart
BY Wm Wallace White
ATT'Y Aug. 19, 1924.  1,505,610
A. STEUART
CLOCK, CHRONOGRAPH, AND THE LIKE
Filed June 22, 1923   2 Sheets-Sheet 2

INVENTOR:
Alexander Steuart
BY Wm Wallace White
ATT'Y.

Patented Aug. 19, 1924.

1,505,610

UNITED STATES PATENT OFFICE.

ALEXANDER STEUART, OF EDINBURGH, SCOTLAND.

CLOCK, CHRONOGRAPH, AND THE LIKE.

Application filed June 22, 1923. Serial No. 647,044.

*To all whom it may concern:*

Be it known that I, ALEXANDER STEUART, a subject of the King of Great Britain and Ireland, residing at 16 Clarence Street, Edinburgh, county of Mid Lothian, Scotland, have invented new and useful Improvements in and Relating to Clocks, Chronographs, and the like, of which the following is a specification.

This invention relates to clocks, chronographs and the like, which are driven by electricity, and has for its object to construct such instruments, or appliances, so as to eliminate the disturbance of the pendulum or balance wheel, due to the friction of unlocking the impulse, driving a count wheel, or working an electric contact. The unlocking, counting and contact breaking, are in this case all done by an electric motor and not by the pendulum, while the usual intermittent clock motion is replaced by continuous motion.

The invention comprises essentially an electric motor which is kept in controlled continuous motion, an impulse or maintaining piece, a cam, eccentric, or the like, an electric contact, and a timekeeper such as a pendulum, or balance wheel and spring. The device may be provided with clock hands and a dial, a commutator or other contact device, and a chronograph drum, with necessary gearing.

The impulse piece, such as a spring or gravity arm, is first set and then released by the motion of an electric motor acting through a train of wheels, and a cam, eccentric, or the like.

The pendulum, or balance wheel, receives an impulse from the impulse piece, which then closes the electric circuit, and electrical energy is thus supplied to the motor.

The motor, in resetting the impulse piece, opens the electric circuit.

The speed of the motor depends on the length of the intervals of time during which the electric circuit is closed.

The continuous motion of the motor, during the time when the circuit is not closed, is maintained by a reduced current which may be shunted past the contact, or by kinetic energy stored in the moving parts, or by both.

The motor is arranged so that if the contacts were always closed, the speed would be in excess of the normal speed required to operate the gravity arm in time with the pendulum. The function of the mechanism is to close the contacts only for such intervals as are required to maintain normal speed. A decrease of motor speed would increase the contact interval and thus accelerate the motor, and, conversely, an increase of speed would decrease the contact interval, and slow the motor. In operation the mechanism soon finds the required constant interval to maintain normal speed.

In order that my said invention and the manner of performing the same may be properly understood, I hereunto append two sheets of explanatory drawings to be hereinafter referred to in describing my invention.

Figure 1 is a front elevation of one example of the apparatus, and Figures 2 and 3 are similar views of modified forms of the apparatus. In these drawings the same reference numerals are used to mark the same or like parts wherever they are repeated.

As shown in Figure 1 of the drawings, the pendulum 1 is suspended by a spring 2, from a support 3. The gravity arm 4 is pivoted at 5 in line with the bending line of the spring 2, or it may be suspended by another spring. The gravity arm 4 is provided with an inwardly projecting member 6 and a contact 7. A lifting arm or lever 8 having a plurality of members, is positioned below the gravity arm 4, and pivoted at 9, so that one of its members 10 contacts at predetermined times with the free end of the gravity arm, while the opposite member 11 carries an anti-friction wheel 12 adapted to bear against a cam or eccentric 13 operated from the motor 14, through a train of wheels indicated by the dotted circles 15 and 16. The remaining member 17 of the lever 8 is shown as positioned at right angles to the other members, and is provided with a counter-weight 18, to keep the wheel 12 in contact with the cam or eccentric 13, and the movement of the lever 8 in one direction is limited by a stop 19. The circuit from the motor 14 is indicated by the dotted lines 20 and introduced into said circuit is a battery 25 or it might be a dynamo or other source of electrical energy and a resistance 26.

Figure 2 shows a modified and more compact form of the apparatus. In this case the lifting arm or lever 8ª, is suspended from the same point as the gravity arm 4ª, but on the opposite side of the pendulum 1, and the counterweight 18ª is incorporated in the anti-friction wheel 12ª, contacting with the cam 13ª, the latter being interposed between the gravity arm 4ª, and the lifting arm 8ª. As the gravity arm 4ª, with its member 6ª and the lifting arm 8ª with its member 10ª, in this case, work and meet behind (or before) the pendulum 1, the latter is driven by a projecting pin 22, fixed on the member 6ª of the gravity arm 4ª.

Figure 3 shows a form of the apparatus in which the impulse is applied at the free or lower end of the pendulum 1ª, by the member 6ᵇ of the gravity arm 4ᵇ, pivoted at 5ª acting on a roller 23, serving as a pallet. The movement of the gravity arm 4ᵇ and lifting arm 8ᵇ, the latter pivoted at 9ª in this case, is up and down, instead of right and left as hereinbefore described, so that the former does not contact with the pendulum 1ª, until the latter has approximately completed its return supplementary arc, otherwise the action is the same as that described with reference to Figures 1 and 2.

Referring especially to Fig. 1, in operation the action of the apparatus is as follows:—The pendulum 1 is operated by the motor 14, which through the cam 13 and lever 8 raises the gravity arm 4, so that when descending, or returning, its member 6 presses against and swings the pendulum to the right. The arm 4 will be arrested when its contact 7 strikes the fixed contact 24, thus completing the circuit, when current will pass from the battery 25 to the motor 14. The pendulum 1 will continue to swing to the right, and the supplementary arc may exceed the impulse arc, if desired. During the supplementary swing of the pendulum 1, to the right, the cam 13 continues rotating and releases the wheel 12 when the lever 8, will move to the left, breaking the contact between the contacts 7 and 24, and raising the gravity arm 4 until the lever 8 is arrested by the fixed stop 19.

On the return swing, to the left, the pendulum 1 will lift the gravity arm 4, from the lever 8, and will complete its supplementary arc in that direction, while the cam 13 in rotating will move the arm 10 of the lever 8 to the right, to allow the gravity arm 4 to descend until the contacts 7 and 24 again close or meet.

With the usual seconds pendulum the cam 13 makes one revolution in two seconds.

The gravity arm 4 and also the lifting arm 8 may be duplicated to give an impulse every second, or the cam or eccentric 13 may be driven more slowly, so that the impulses are at longer intervals than two seconds during such intervals the lifting arm 8 may hold the gravity arm 4 clear of the pendulum 1, which will swing freely.

The resistance 26 prevents sparking at the contacts, and passes current to keep the motor 14, in motion while the contacts are open.

The battery 25, motor 14, and resistance 26 are designed and regulated so that the speed of the motor is above the normal speed with the contacts kept closed, and below the normal speed with the contacts kept open.

It will be obvious that whilst the movement of the pendulum 1 is obtained from the motor 14, yet the former controls, or governs, the speed of the latter.

The motor, controlled as hereinbefore described may be utilized for example in connection with the driving of clock hands, recording drums and telescopes. The device may drive such appliances mechanically, or may operate an electric contact or commutator, to provide impulses of current at regular intervals, and so operate or control the appliances electrically at a distance in the usual manner.

What I claim is:—

1. An electric clock, comprising a clock mechanism, an electric motor having a continuously rotatable member operatively connected to said mechanism, an electric circuit for supplying current to said motor and including a movable contact and a fixed contact adapted to control the speed of the motor, an arm carrying said movable contact and operated by the clock mechanism to open said contacts, and an oscillatory member adapted to receive its impulse from said arm and through it to control the closing of said contacts.

2. An electric clock, comprising a clock mechanism, an electric motor having a continuously rotatable member operatively connected to said mechanism, an electric circuit for supplying current to said motor and including a movable contact and a fixed contact adapted to control the speed of the motor, a gravity arm carrying said movable contact and operated by the clock mechanism to open said contacts, and a pendulum adapted to receive its impulse from said arm and through it to control the closing of said contacts.

In testimony whereof I have signed my name to this specification.

ALEXANDER STEUART.